United States Patent [19]
Sartorius

[11] 3,786,161
[45] Jan. 15, 1974

[54] PROCESS AND APPARATUS FOR MONITORING AND CONTROL OF METALLURGICAL FURNACES

[75] Inventor: Guy Sartorius, Bau-Saint-Martin, France

[73] Assignee: Societe Des Aciers Fins De L'Est, Paris, France

[22] Filed: July 6, 1973

[21] Appl. No.: 376,985

[30] Foreign Application Priority Data
July 11, 1972 France .......................... 72 25154

[52] U.S. Cl. ................................. 13/12, 236/15 B
[51] Int. Cl. ............................................ F27d 11/10
[58] Field of Search .............. 13/12, 13; 236/15 A, 236/15 B

[56] References Cited
UNITED STATES PATENTS
3,600,149  8/1971  Chen et al. ...................... 236/15 B
3,743,752  7/1973  Furuhashi ............................. 13/12

Primary Examiner—Roy N. Envall, Jr.
Attorney—Browne, Beveridge, De Grandi & Kline

[57] ABSTRACT

A process and apparatus for the monitoring and control of the heating conditions of a metallurgical furnace. The inside surface temperature of the furnace walls is continuously measured and after the temperature reaches a predetermined minimum, the temperature increase per unit time is also measured. When both the temperature increase per unit time and the temperature exceed predetermined minimum values an alarm is operated and control signals are inputted to control circuitry for decreasing the temperature by carrying the electrode current and by reducing the furnace voltage if varying the electrode current does not produce a desired reduction in the temperature increase per unit of time after a predetermined period.

10 Claims, 2 Drawing Figures

PROCESS AND APPARATUS FOR MONITORING AND CONTROL OF METALLURGICAL FURNACES

The present invention relates to a process for the continuous monitoring and control of the heating of metallurgical electric arc furnaces of the kind used in steel works and more generally for the monitoring and control of apparatuses for melting metals generally, such as blast furnaces, converters, cupolas and the like.

There have been recent improvements in metallurgy, more particularly steel works arc furnaces, in the form of rapid electronic control systems for arc furnace electrodes, leading to increased electrical power being usable in a given furnace. Of course, the cost of the refractories used to protect furnace inside walls, and labor costs, decrease with furnace capacity.

In arc furnaces the peak power of each arc should of course be kept highly constant during melting to ensure that the average power used is very near maximum power. The electrode should therefore descend in proportion as the recess forms in the solid material for melting, the arc neither lengthening nor shortening.

Also, electrode control should be such that at no time can any electrode contact the liquid bath or the solid charge, to reduce the risk of recarburization and electrode breakage.

In the conventional control systems which have always been used in furnaces, control of electrode height above the bath is based solely on electrical criteria. The normal practice is to maintain the voltage/current ratio constant for each electrode whatever the melt state of the charge. A constant impedance adjustment of this kind gives minimum electrode movement and ensures that the electrodes do not drop in the event of a current failure.

However, the power supplied is always adjusted empirically in dependence upon how far the various melts have proceeded and with the emphasis on the gentlest possible treatment of the furnace refractories in the light of the operating features of individual furnaces.

No existing control system can therefore provide continuous supervision of the heating conditions in an arc furnace in response to an arbitrary power input based on purely electrical or power criteria. A disadvantage of this kind is a particular nuisance in modern furnaces, where powers are continuously increasing and therefore increasing the risk of damage to the furnace inside walls.

This invention relates to a process for the continuous control of the heating conditions of means for melting metals, more particularly of a steel works arc furnace, to give maximum use of furnace capacity, an appreciable time saving and more even and less severe wear of refractory walls than in conventional furnaces.

According to this invention, the process for the continuous control of the heating conditions of a metallurgical furnace comprises continuously measuring the inside surface temperature of the furnace walls, checking the temperature increase per unit of time after the passage of the temperature curve through a minimum, and operating the furnace control immediately when the temperature increase per unit of time exceeds a predetermined value for a predetermined time, the temperature exceeding the minimum of the temperature curve by a predetermined value.

Preferably, the furnace control also operates if the measured temperature exceeds a critical value.

A temperature detector of the kind described in the Applicants' French Patent Application No. 72,21944 of June 16 1972 for "Continuous temperature measuring device for metallurgical furnace" is used, preferably to the number of one for each electrode, to make a continuous measurement of the inside surface temperature of the furnace walls; such a detector has an appropriate mechanism which makes it move back automatically in dependence upon wear of the refractory walls. The inside surface temperature thereof can be measured very accurately and the measurement is unaffected by splashing from the bath and by fusion products of the walls.

Preferably, the process is adapted more particularly to continuous control of the heat conditions in an electric arc furnace and comprises in such a case acting directly on the means for varying the current energizing the electrodes so as to restore the temperature increase per unit of time to or below a predetermined value. In this preferred form of the process, the furnace voltage is reduced only when, at the end of a predetermined time after action on the current of the particular electrode concerned, the temperature increase per unit of time still exceeds a voltage-reduction value or second predetermined value (i.e. a value at which the voltage of the furnace must be rapidly reduced) which can be determined on the basis of the operator's experience and which is less than the predetermined value of temperature increase per unit of time, or when the temperature remains above the critical value previously mentioned. The end result is optimization of melting in an arc furnace.

This invention also relates to means for automatically controlling the heating conditions of a facility for melting metals, for carrying out the process according to the invention; such means comprises a potentiometric recorder of the inside surface temperature of the walls, the recorder being connected to a minimum signal detector and to an analog module for forming the time differential of the temperature. The minimum detector and the differential-forming module are each connected via their respective outputs to a critical value comparator and to the input of an analog AND module whose output controls a warning.

Preferably, more particularly for automatic control of heating conditions in an electric arc furnace, the output of the analog AND module is directly connected to the current control for the electrodes so as to act on arc length and restore the temperature increase per unit of time to or below its predetermined value.

Preferably, a comparison module is connected to the differential-forming module by way of an adjustable delay facility and compares the differential of the temperature with a predetermined voltage-reduction value. The comparison module is adapted to act on a changeover contact so as to operate the electrode current control facility when the measured differential is below the voltage-reduction value. Similarly, the module can cause a voltage reduction when the differential reaches the comparison voltage value.

Advantageously, an OR module is directly connected to the output of the comparison module so as also to produce a voltage reduction should the temperature rise relatively slowly yet be high enough to be dangerous despite the power reduction.

This invention will be more clearly understood from a study of an embodiment of an apparatus for automatically monitoring and controlling the heating conditions of an electric arc furnace, the description being exemplary and non-limiting and referring to the accompanying drawins wherein.

Figure 1:
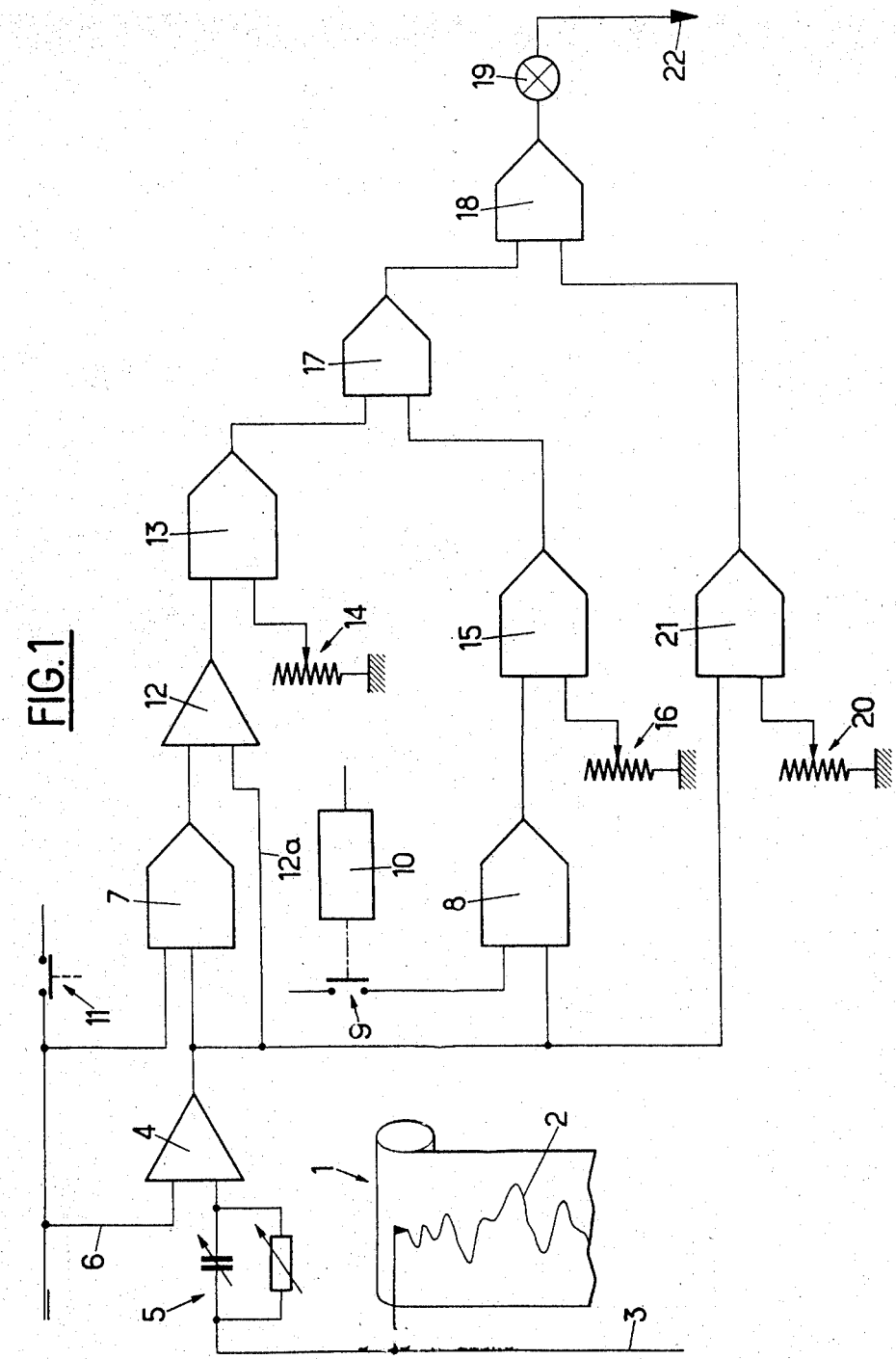
FIG. 1 is a block diagram of an embodiment of the invention for monitoring the heat conditions of a furnace.

In the form shown in FIG. 1, the means according to the invention for providing continuous monitoring of the heating conditions of an arc furnace comprise a potentiometric temperature recorder 1 which traces a curve 2 representing variations of the inside surface temperature of the furnace walls. Such temperature is measured by an appropriate detector known to those skilled in the art such as a thermocouple whose output is connected by a line 3 to recorder 1.

The thermocouple output is also applied via a smoothing device 5 such as a filter to an amplifier 4 which has one of its inputs connected to a reference voltage via line 6 and switch 11.

The amplifier output signal, which represents the value of the measured temperature, is applied to an analog minimum signal detector 7 and to an analog module 8 which forms the time differential of the temperature. Module 8 also receives the reference voltage via switch 11 when switch 9 is closed by delay means 10, which is adjusted to provide a delay from the time heating is begun so that monitoring of the rate of change of the analog signal does not begin until the temperature reaches a predetermined minimum. In an exemplary embodiment this time is from 8 to 10 minutes or, preferably, half a minute per ton of solid furnace charge.

The details of detector 7 are known to those skilled in the art and it can e.g., be a conventional peak analog detector such as a zero slope detector arranged to detect minima and not maxima (slope change from negative to positive) and is a means of discovering the lowest temperature trough between two melts of baskets of solid metal. Detector 7 also receives the reference voltage via a main switch 11 which, when the furnace vault is open, interrupts the operation of the complete monitoring and control system by interrupting the reference voltage and thus restoring the delays to their respective initial values.

An analog module 12 carries out a subtraction operation between the temperature value output from amplifier 4 via line 12a and the minimum temperature found by the detector 7. The output of module 12 is connected to the input of comparator 13 which compares the difference between the actual temperature and the minimum temperature, or $\Delta T = T - Tm$, in which T denotes the measured temperature and Tm denotes the minimum detected temperature, with a predetermined critical temperature interval $\Delta Tc$ which is set arbitrarily by means of potentiometer 14.

Similarly, the output of module 8 is connected to the input of a comparator 15 which compares the measured derivative value with a critical value given by an adjustable potentiometer 16.

An AND gate 17 is energized at its input by the output of the two comparators 13, 15 and so outputs a signal only if the difference between the measured temperature and the minimum temperature is above the critical value and if the time differential of the temperature is simultaneously above the critical value. The output signal from module 17 energizes an alarm means 19 by way of an analog OR module 18, which can also operate the alarm 19 when the measured temperature represented by the signal from amplifier 4 exceeds a predetermined maximum set on potentiometer 200 Module 21 compares the measured actual temperature with the maximum permissible value.

The means according to the invention operate as follows:

first, the furnace operator sets the appropriate critical value $\Delta Tc$ on the adjustable potentiometer 14. For instance, it may be decided that the warning will not be triggered until the temperature exceeds an appropriate value such as 200°C., the lowest trough found, so as to give time for scrap to break down, since a breakdown of this kind in the furnace might be the result of an abrupt temperature increase which would entail no risk of over-heating the furnace, since the temperature rise ceases immediately when the scrap covers the temperature detector again.

The operator also sets the critical maximum limit of the slope of the temperature curve 2 in dependence upon time. The maximum permissible slope value can be found by experiment and may be e.g., 150°C/minute. Beyond this value overheating starts, and unless the overheating is due to a partial breakdown of scrap, the furnace voltage must be reduced very rapidly for it would then be harmful and pointless to maintain a constant power.

Also, the operator can use potentiometer 20 to set a maximum temperature limit, the invention thus providing an extra safeguard.

The operator also sets the required delay of delay means 10 so that supervision of the slope of the temperature curve 2 is operative only after melting has begun satisfactorily, Once started by the main switch 11, the continuous supervisory means according to the invention can therefore trigger an alarm 19 before the occurrence of any real overheating lasting long enough to damage the furnace walls. Time is therefore saved on each pouring as compared with the conventional operating steps of a furnace which does not have the continuous supervisory means according to the invention and whose voltage has to be reduced as a precaution and often prematurely.

Referring to FIG. 1, the output of the monitoring means according to the invention is shown as an arrow 22 which indicates that once the alarm 19 has been set off the operator will have enough time to exercise control on the furnace control system.

Figure 2:
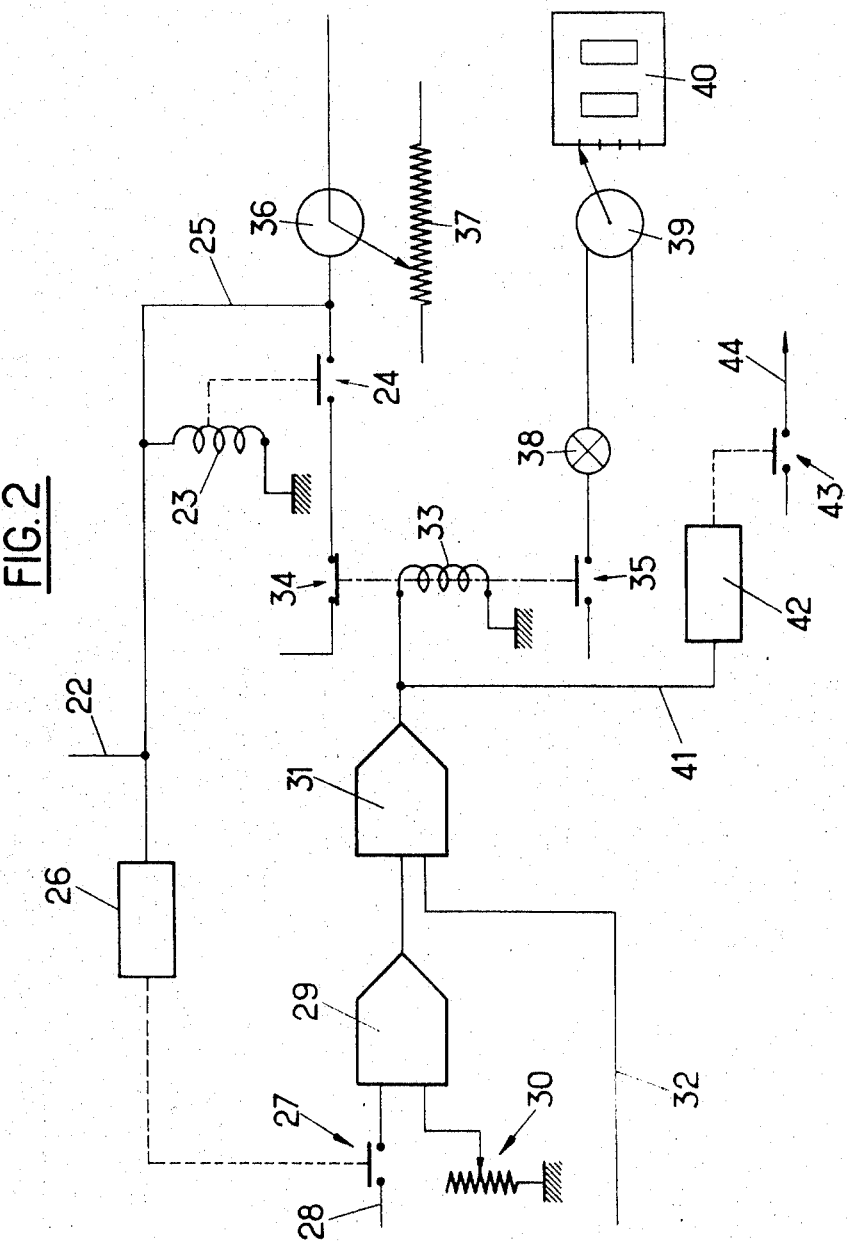
FIG. 2 is a block diagram of an embodiment of the invention for controlling the heat conditions of a furnace in response to the monitor signals provided by the system of FIG. 1.

In the embodiment shown in FIG. 2, control is fully automatic, the output 22 of the continuous monitoring means of FIG. 1 being connected to a static relay 23 which is fed with a line 25 and which activates a switch 24, and a switch 27 which is fed with a signal through delay means 26.

Also, the output of the analog module 8 of FIG. 1 is connected by line 28 of FIG. 2 and via switch 27 to comparator 29. A predetermined voltage-reduction value for the time differential of the temperature can be set on an adjustable potentiometer 30. The comparator 29 compares the actual value of such differential and the voltage-reduction value and, by way of analog OR module 31, outputs a signal to static relay 33 so as to close and open contacts 34 and 35 alternately. Contact 34 is disposed in the current control circuit of the conventional control circuit for arc furnace electrodes, this system including a servomotor 36 which varies the current at each electrode between its limits by means of a potentiometer 37.

The second input of OR module 31 is a line 32 connected to the output of module 21 of FIG. 1 for determining the maximum temperature threshold.

Contact 35 is disposed in the voltage control circuit of the furnace, such circuit including an alarm 38 and a voltage reduction ofacility 39 which is shown diagrammatically in FIG. 2 and which acts on furnace transformer 40.

Also, a safety device represented by a relay 43 in circuit 44 of the furnace circuit breaker is connected via a delay device 42 and line 41 to the output of OR module 31.

The means according to the invention for automatic control of the heat conditions of an electric arc furnace operate as follows: While furnace heat conditions are Such that the monitoring facility of FIG. 1 outputs no signal — i.e., inter alia the slope of the temperature curve 2 is below the critical value determined by potentiometer 16 — the switch 24 remains open, in the position shown in FIG. 2. Comparator 29 neither receives nor outputs a signal and the contacts 34 and 35 are in their normal position as shown in FIG. 2 — i.e., contact 34 is in the closed state and contact 35 is open. Clearly, therefore, the current control circuit is inoperative, since switch 24 is open and the voltage control circuit is also inoperative, due to contact 35 being open.

When the temperature curve slope exceeds the critical value determined by potentiometer 16 and comparator 13 also outputs a signal, module 18 outputs a signal too at 22 which acts on relay 23 to close contact 24, whereafter relay 23 sticks by way of contact 24 and loop 25. Since contacts 24 and 34 are closed, the current control of the furnace is operative and the servomotor 36 acts on arc length, reducing power. If nevertheless, and after a time predetermined by the delay means 26, the slope of curve 2 is still above the predetermined voltage-reduction value set on potentiometer 30, comparator 29 outputs a signal and the contacts 34, 35 move from their normal position, contact 34 opening and contact 35 closing. Similarly, if the temperature exceeds the threshold set by module 21, the OR module 31 so acts on relay 33 as to open contact 34 and close contact 35. The voltage-reduction facility is then energized and acts on transformer 40.

The predetermined voltage-reduction value usually is lower than the critical value set on potentiometer 16.

Clearly, therefore, when the furnace is operating in heat conditions in which the current control circuit of the furnace is on load — i.e., when the switches 24 and 34 are in the closed state — the servometer 36 controlling the furnace tap changer can act on arc length by increasing the current per electrode within its limits, so that the arc voltage drops and the curve 2 is restored to below the critical value of the potentiometer 16.

The critical value of the temperature rise per unit of time as set on potentiometer 16 can therefore be followed very closely.

If despite action on electrode currents the slope 2 exceeds the voltage-reduction value determined by potentiometer 30 or if the temperature is above the limiting threshold, comparator 29 outputs a signal which opens contact 34 and closes contact 35. The current control circuit is tripped, the alarm 38 operates and the furnace voltage is reduced automatically by means of voltage reducer 39 and transformer 40. The invention thus provides means making it possible to achieve real optimization of melting in the furnace, since the critical value of the differential of the temperature can be followed very closely and the electrical current control can be acted on if the temperature curve slope stays above the voltage-reduction value.

This invention is a means of controlling and adjusting metallurgical furnaces, inter Alia electric arc furnaces, and gives more thorough use of maximum furnace power and appreciable savings of time. The means according to the invention help to even out the wear of the refractory walls of the furnace and to reduce electrode consumption considerably.

I claim:

1. A process for the continuous monitoring and control of a metallurgical furnace having furnace walls comprising the steps of continuously measuring the inside surface temperature of the furnace walls, measuring the temperature increase per unit time of the inside of the furnace walls after the temperature has reached a predetermined minimum, and decreasing the operating temperature of the furnace when the temperature increase per unit of time exceeds a predetermined value for a predetermined time and the temperature exceeds said predetermined minimum by a predetermined value.

2. A process according to claim 1, wherein the operating temperature of the furnace is also decreased when the measured temperature exceeds a critical value.

3. A process according to claim 1 wherein said furnace is an arc furnace having electrodes which are excited by a furnace voltage resulting in electrode currents, said furnace temperature being decreased by directly varying the electrode current to restore the temperature increase per unit of time below said predetermined value, and said furnace voltage being reduced only when the temperature increase per unit of time is still above a second predetermined value of temperature increase per unit of time at a predetermined period of time after said electrode current is varied, said second predetermined value being below said predetermined value.

4. A process according to claim 3, wherein said furnace voltage is reduced when the measured temperature is above said critical value after a predetermined time.

5. Apparatus for the continuous monitoring of the heating of a metallurgical furnace having walls comprising means for measuring the inside surface temperature oF said walls, and for generating an electrical analog signal corresponding thereto, minimum signal detector means, said analog signal being fed to said minimum detector means which detects the minimum of said analog signal and generates an output signal corresponding thereto, said output signal and said analog signal being fed to a subtraction means, for generating an output signal corresponding to the difference of said analog signal and said minimum, said analog signal also being fed to a differentiating means which produces an output signal corresponding to the time differential of the temperature, first comparator means for generating an output signal if said difference signal is above a critical value, second comparator means for generating an output signal if said differential signal is above a critical value, the outputs of said first and second comparator means being fed to an AND gate for effecting the generation of a warning signal.

6. Apparatus according to claim 5 further including an OR gate, the output of said AND gate forming one input thereto, the other input being the output of a comparator means which compares the measured temperature with a critical value.

7. Apparatus according to claim 5 wherein said furnace is an arc furnace having electrodes and wherein the output of said AND gate is connected to a current control means for said electrodes to control the arc length thereof for decreasing the temperature increase per unit of time.

8. Apparatus according to claim 7, wherein a comparison module connected via a delay device to the output signal of said differentiating means compares the output signal of said differentiating means with a predetermined voltage-reduction value activates a means to reduce the furnace voltage when said output signal exceeds said voltage-reduction value at a predetermined period of time after said arc length is controlled.

9. Apparatus according to claim 8 further comprising an OR gate, the inputs of which are connected to the output of said comparison module and to said comparator means which compares the measured temperature with a critical value.

10. Apparatus according to claim 9, further including a delay relay means for interrupting furnace operation if said measured temperature or its differential exceeds predetermined values.

* * * * *